United States Patent
Song et al.

(10) Patent No.: US 7,691,934 B2
(45) Date of Patent: Apr. 6, 2010

(54) HIGH MOLECULAR WEIGHT POLY(DIALLY DIALKYL) AMMONIUM SALTS

(75) Inventors: Zhiqiang Song, Newton, CT (US); George William Schriver, Fort Lee, NJ (US); Holger Reinicke, Lörrach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 805 days.

(21) Appl. No.: 11/583,604

(22) Filed: Oct. 19, 2006

(65) Prior Publication Data

US 2007/0093626 A1   Apr. 26, 2007

Related U.S. Application Data (60) Provisional application No. 60/729,123, filed on Oct. 24, 2005.

(51) Int. Cl.
  *C08J 3/03* (2006.01)
  *C08F 2/16* (2006.01)
(52) U.S. Cl. .......... 524/458; 524/457; 524/460; 524/700; 524/755; 524/792; 524/794; 526/295; 526/310; 526/336

(58) Field of Classification Search .......... 524/457, 524/458, 460, 700, 755, 792, 794; 526/295, 526/310, 336
See application file for complete search history.

(56) References Cited

U.S. PATENT DOCUMENTS

| | | | | |
|---|---|---|---|---|
| 4,713,431 | A | 12/1987 | Bhattacharyya et al. | 526/207 |
| 5,185,411 | A | 2/1993 | Jueptner et al. | 526/200 |
| 5,248,744 | A | 9/1993 | Cramm et al. | 526/73 |
| 7,473,334 | B2 * | 1/2009 | Wong Shing et al. | 162/164.6 |
| 2004/0030039 | A1 | 2/2004 | Hund et al. | 524/800 |

FOREIGN PATENT DOCUMENTS

GB   2046279   11/1980

OTHER PUBLICATIONS

English language abstract No. 1981:443953 of JP 56018611.

* cited by examiner

*Primary Examiner*—Helen L. Pezzuto
(74) *Attorney, Agent, or Firm*—Shiela A. Loggins (57) ABSTRACT

The invention is directed to a method of making ultra high molecular weight diallyldialkyl ammonium salt homopolymers, compositions thereof and use of compositions as a fixative in papermaking.

28 Claims, 5 Drawing Sheets

Figure 2: Wood pitch particle size distribution with 0.5 kg/t vs. 0.8 kg/t dosage Figure 3: Wood pitch particle size distribution with 1.2 kg/t dosage

HIGH MOLECULAR WEIGHT POLY(DIALLY DIALKYL) AMMONIUM SALTS

This application claims the benefit under U.S. provisional application No. 60/729,123, filed Oct. 24, 2005.

FIELD OF THE INVENTION

The invention is directed to a method of making ultra high molecular weight diallyldialkyl ammonium salt homopolymers, compositions thereof and use as a fixative in papermaking.

BACKGROUND

Polymers formed from diallyl dialkyl ammonium monomers have a wide variety of uses. The cationic polymers, for example, can be used as flocculants or coagulants in water and sewage treatment systems. It has been shown that the higher the molecular weight of the resulting cationic polymer, the more effective the polymer is as a flocculating or coagulating agent.

However, homopolymers formed from diallyl dialkyl ammonium monomers do not readily polymerize to produce high molecular weight polymers. When attempts have been made to make high molecular weight products, agglomeration may result during the suspension or emulsion polymerization; insolubles may form indicating too much crosslinking which seriously interferes with application effectiveness and decreasing water-solubility of the final polymer products; and low monomer conversion may leave more than about 5 wt % residual monomer limiting the applicability of the final high molecular weight formed diallyl dialkyl ammonium polymer.

Despite the wealth of literature on diallyl dimethyl ammonium chloride (DADMAC) polymers, there is little in the art showing the preparation of polyDADMAC (homopolymer of DADMAC) with ultra high molecular weight.

Japanese Patent 56-18611 exemplifies a polyDADMAC having intrinsic viscosity 4.07 dl/g (at 30° C. in a 5% aq. NaCl soln.) and solution viscosity (0.5% solids in $H_2O$) 305 cP at 20° C. The procedure of the Japanese process involved using a polymerization time of one week at low temperatures. This process is obviously not commercially feasible. Furthermore, the polyDADMAC formed is a gel not a bead.

U.S. Pat. No. 5,248,744 discloses a process for the polymerization of DADMAC in an aqueous solution. The polymers disclosed show an intrinsic viscosity varying from 0.87 to 2.07 dL/g measured in 1.0 M sodium nitrate. This reference requires the slow addition of initiator at two points during the polymerization of DADMAC.

U.S. Pat. No. 5,185,411 discloses a two phase process for synthesizing PolyDADMAC beads by inverse suspension polymerization. The examples record a weight average molecular mass ranging from 1,340,000 g/mole to 2,340,000 g/mol. No description of the method for measuring the molecular weight is given. The percent conversion varies from 87.4 to 94.7 weight %. The process disclosed uses less than 1 wt. % of initiator based on the total weight of monomer.

Copolymers of DADMAC with other monomers, such as acrylamide are well known in the art. For example, U.S. Pat. No. 4,713,431 discloses high molecular weight DADMAC copolymers by emulsion polymerization of DADMAC with small amounts of acrylamide. Acrylamide monomer has a reactivity much higher than DADMAC and is known to produce polymers with a molecular weight much higher than that of DADMAC. These copolymers with acrylamide level from 0.44 to 13 wt. % show intrinsic viscosities which vary from 1.7 dL/g to 4.6 dL/g. The copolymers with acrylamide level lower than 1 wt. % have an intrinsic viscosity lower than 2.0 dL/g. The emulsion copolymers contain high residual DADMAC monomer of more than 7 wt. %. For many applications however, DADMAC homopolymers are preferred to copolymers.

U.S. Published Application No. 2004/0030039 discloses a polymerization process for the preparation of polyDADMAC nodules with high bulk viscosities at 20 wt. % (20% BV) ranging from 11,500 cps to 97,000 cps. The reference assumes a linear relationship between 20% BV and molecular weight with the proportionality factor based on the measured molecular weight of 100,000 polyDADMAC.

The process disclosed in this reference requires a specific high initial monomer concentration range of from 67 to 77%. The reaction producing the alleged high molecular weight polyDADMAC is run for several hours at a temperature of about 60° C. The molecular weight of the polyDADMAC formed in U.S. Published Application No. 2004/0030039 is measured using 20% BV. In contrast, the polyDADMAC formed in the present invention is of such high molecular weight that values of 20% BV are too concentrated and produce much higher bulk viscosities than 10,000 cps, and can not be conveniently measured using 20% BV.

In the present invention, bulk viscosity of a polymer solution in water at a concentration of, preferably, 1.0 wt %, and at a temperature of 25° C. is used to indicate the MW of polyDADMAC.

Surprisingly the inventors have made a polyDADMAC of high bulk viscosity at 1% polymer concentration (1% BV) of greater than 20 cps distinguished from known commercial polyDADMAC products. Additionally, the Inventors have accomplished this by a method which polymerizes DADMAC in high conversion without aggregation problems commonly associated with suspension polymerization and emulsion polymerization.

The ultra high molecular weight polyDADMAC of the invention has been shown to be especially useful as a fixative in papermaking applications. Today the papermaker is facing environmental, economic and quality pressures, which result in closure of water systems, lower basis weights, replacement of virgin fiber by recycled fiber and at the same time declining quality of recycled fiber and higher ash contents therein. These factors have resulted in furnish which is high in colloidal dispersions. The ultra high molecular weight polyDADMAC of the invention shows particularly good performance in papermaking applications where fixation of colloidal hydrophobic dispersion resulting from pitch, "white pitch" or "stickies" is important.

SUMMARY OF THE INVENTION

The present invention relates to a method of making ultra high molecular weight homopolymers formed from diallyldialkyl ammonium salt monomers.

The method comprises i) preparing an aqueous monomer phase containing the monomer,
    a radical initiator or mixture of radical initiators,
    and optionally a chelating agent, ii) heating the monomer phase at temperature(s) below about 60° C. to a monomer conversion of from about 80 to about 99 wt. %, preferably from about 85 to about 98 wt. %, and most preferably from about 90 to about 96 wt. % homopolymer, wherein substantially all the initiator(s) is added in step i) or before heating in step ii) and the initiator concentration is about 0.1 to about 5.0 wt. % based on the monomer, and iii) then post treating the formed homopolymer by heating to a temperature in the range from about 60 to about 120° C.

The invention is also directed to compositions of the formed ultra high molecular weight homopolymer:

A diallyldialkyl ammonium salt homopolymer formed by the method described above;

A bead which is an ultra high molecular weight homopolymer formed from diallyldialkyl ammonium salt monomer wherein the homopolymer has an intrinsic viscosity in 1M NaCl aqueous solution at 30° C. of above 2.0 dL/g or a bulk viscosity at 1% polymer concentration in water and at 25° C. (1% BV) of above 20 cps;

A bead comprising a homopolymer formed from diallyldialkyl ammonium salt monomer and the homopolymer bead incorporates at least about 92 or 95 wt. % of the diallyldialkyl ammonium salt monomer, preferably at least about 97 wt. % and especially at least about 98 wt. % of the homopolymer.

The invention is also directed to a method of controlling pitch and stickies deposition in papermaking, which method comprises the step of adding to the paper furnish prior to sheet formation at least one of the following compositions a) a polymer formed by the method described above;

b) a ultra high molecular weight homopolymer formed from diallyldialkyl ammonium salt monomer wherein the homopolymer which has an intrinsic viscosity in 1M NaCl aqueous solution at 30° C. of above 2.0 dL/g or a bulk viscosity at 1% polymer concentration in water and at 25° C. (1% BV) of above 20 cps;

or c) a bead comprising a ultra high molecular weight homopolymer formed from diallyldialkyl ammonium salt monomer which incorporates at least about 92 wt. %, preferably at least about 95 wt. % and especially at least about 97 wt. % of the of the monomer into the homopolymer.

Additionally, the invention encompasses paper or board incorporating any one of a), b) or c) compositions.

DETAILED DESCRIPTION OF THE INVENTION

The method for preparing a homopolymer formed from diallyldialkyl ammonium monomer summarized above involves preparing an aqueous monomer phase of about 50 to about 90 wt. % containing a diallyldialkyl ammonium salt monomer, preferably a halide salt, a radical initiator concentration of about 0.1 to 5 wt. % based on the monomer weight, and optionally a chelating agent and then polymerizing the aqueous monomer phase as is in an aqueous solution to form a soluble gel (gel polymerization). Alternatively, the aqueous monomer phase may be dispersed in a water-insoluble medium as in inverse suspension polymerization to give a product in the form of beads (bead polymerization), or by emulsifying the aqueous monomer phase in water-insoluble medium with sufficient amount of emulsifier as in inverse emulsion polymerization to give polymer in the form of gel in a liquid emulsion (inverse emulsion polymerization).

The polymerization may be proceeded by heating at temperature(s) below about 60° C. to a monomer conversion of from about 80 to about 99 wt. %. preferably from about 85 to about 98 wt. %, and most preferably from about 90 to about 96 wt. %. The formed polymer is then post treated by heating to a higher temperature, in the range from about 60 to about 120° C. depending on the type of initiator or mixture of initiators used.

The heating in step ii) may vary from about room temperature or 25° C. to about 60° C. Preferably the heating in step ii) may vary from about 40° C. to about 60° C.

The monomer of the aqueous monomer phase preferably is a monomer of formula (I)

wherein $R_1$ and $R_2$ independently are hydrogen or $C_1$-$C_4$ alkyl, hydroxyl $C_1$-$C_4$ alkyl, carboxy $C_1$-$C_4$ alkyl, carboxyamide $C_1$-$C_4$ alkyl, alkoxyalkyl group, wherein the alkoxyalkyl group is defined as having from 1 to 18 carbon atoms in the alkyl group;

$R_3$ and $R_5$ independently are hydrogen, methyl, ethyl or halogen;

$R_4$ and $R_6$ independently are hydrogen, $C_1$-$C_6$ alkyl, or halogen; and $Y^-$ is an anion.

$Y^-$ is preferably a halide.

The diallydialkyl ammonium salt is preferably a halide salt and the diallyldialkyl ammonium is a monomer of formula (I). Most preferably the diallydialkyl ammonium salt is DADMAC.

The dialllydialkyl ammonium salt of formula (I) is further defined as below.

Illustrative examples of anions represented by Y are the halide ions, (that is, Y can represent halogen; more particularly, chlorine, bromine, fluorine or iodine), sulfate, sulfonate, phosphonate, hydroxide, borate, cyanide, carbonate, thiocyanate, thiosulfate, isocyanate, sulfite, bisulfite, nitrate, oxalate, silicate, sulfide, cyanate, acetate, and the other common inorganic and organic anions.

$C_1$-$C_4$ alkyl is linear or branched and may be for example methyl, ethyl, propyl and its isomers or butyl and its isomers.

Hydroxyl $C_1$-$C_4$ alkyl is linear or branched for example hydroxyl methyl, hydroxy ethyl, di-hydroxy ethyl, hydroxy propyl, di-hydroxy propyl or hydroxy butyl. There may be more than one hydroxyl on one or more of the carbons of the $C_1$-$C_4$ alkyl group.

Carboxyamide $C_1$-$C_4$ alkyl and carboxy $C_1$-$C_4$ alkyl are for example carboxy or carboxyamide methyl, ethyl, propyl, isopropyl, butyl, sec-butyl or isobutyl carboxyamide or carboxyl, wherein the carboxyamide of carboxyl group interrupts the alkyl chain or terminates the alkyl chain.

Alkoxyalkyl group wherein the alkyl group is defined as having 1 to 18 carbons is for example typically methoxy, ethoxy, n-propoxy, isopropoxy, butyloxy, pentyloxy, hexyloxy; heptyloxy, dodecyloxy, hexadecyloxy, octadecyloxy, tert-butyloxy, oleyloxy.

Specific examples of the cationic monomers include the diallyl dimethyl, dimethallyl dimethyl and diethallyl dimethyl, diallyl di-(beta-hydroxyethyl) and diallyl di-(beta-ethoxyethyl) ammonium chlorides, bromides, phosphates and sulfates of which the diallyl dimethyl ammonium halides are preferred. Specifically the most preferred monomer of formula (I) is diallydimethy ammonium chloride (DADMAC).

The presence of active initiator(s) present in the polymer formed in step ii) is important for the final polymerization in the post treatment.

At least 0.5 wt. % of the initiator(s) added in step i) or added before heating in step ii), preferably about 1.0 wt. %, most preferably about 1.2 wt. % is available for the post treatment in step iii). The wt. % of unreacted initiator is based on the starting or total monomer weight.

To further clarify, if 1.0 wt % radical initiator(s) is added in step i), then at least 0.5 wt % of unreacted initiator(s) based on the weight of the original monomer concentration must be available (½ of the original charge) for the post treatment. It is preferable that at least half of the radical initiator(s) initially charged before the heating step ii) are available for reaction in the post treatment step iii). For example, if 2.0 wt % radical initiator(s) are originally charged, then at least about 1.0 wt % initiators are available for the post treating step iii).

The presence of unreacted initiator is especially important when the aqueous monomer phase is dispersed in a water insoluble medium and the polymer formed in step ii) is a bead. These beads are relatively hard, particularly when they are of high molecular weight. Once the beads are formed, further addition of initiator(s) to the beads becomes difficult. Thus it is important that unreacted initiator is also present in the bead in order to insure high conversion of the residual monomer in the post treated polymer.

Substantially all the initiator or initiators are added in step i). Substantially for purposes of the invention means, at least about 90 wt. % of the total initiator used in the polymerization is added in step i) or before heating in step ii). Preferably, at least about 92 wt. % or especially 95 wt. % is added in step i) or before heating in step ii). Most preferably 100% of the initiator is added in step i) or before heating the reaction mixture in step ii).

The temperature control stages are so designed that enough initiator is left for step iii) of higher temperature post treatment to boost molecular weight, presumably by chain extension, branching or crosslinking of the formed polymer, and at the same time substantially reduce residual monomer.

The post treating temperature will vary depending on the type of initiator used. When V-50 (2,2'azobis-(2-amidinopropane) dihydrochloride) initiator is used, preferably the post-treating temperature is from about 65 to about 90° C., and more preferably from 70 to 85° C., for about 30 to 240 minutes, preferably 60 to 180 minutes, and more preferably from 90 to 120 minutes.

The heating from the reaction temperature at the end of step i) to the desired temperature in the post treating step is preferably fast with the rate of temperature increase between steps is preferably from about 0.1 to about 30° C./min and more preferably from about 0.5 to about 5° C./min.

The post treatment temperature may be for example significantly higher than the 10 hrs half-life decomposition temperature, preferably near the 1 hr half-life decomposition temperature of the initiator used.

Suitable pH of the aqueous phase depends on monomer and initiator used. For DADMAC monomer, the pH can range from 1 to 14, preferably from 4 to 8 when using persulfate initiator, and from 3 to 7 when using V50 water-soluble azo initiator.

It is necessary at this point to give a brief overview of the relationship between various measurements typically used to compare molecular weights of polymers.

This invention uses the 1% BV to measure and compare molecular weight of polyDADMAC products because it is more objective and more convenient than the other methods.

Polymer molecular weight (MW) can be determined directly and indirectly by a number of methods. Light scattering methods can be used to measure weight average molecular weight. However, the measurement requires a very clean system and can be very time consuming. Light scattering instruments are not widely available or used for quality control in manufacturing.

Gel permeation chromatograph (GPC) is widely used for polymer MW determination. However, so far there is no GPC column available that can reliably measure water-soluble polymers, especially cationic polymers such as polyDADMAC, with molecular weight well above 1 million. Another shortcoming of the GPC method is that results can vary significantly when measured with different equipments and conditions, such as, MW standards used, column type, mobile phase, flow rate, etc.

Intrinsic viscosity (IV) is another way of measuring MW and can be related to MW by Mark-Houwink-Sakurada equation 1 below [Polymer Handboo, 4$^{th}$ edition (John Wiley & Sons 1999) by J. Brandrup, E. H. Immergut and E. A. Grulke, section VII]:

$$IV = K*MW^\alpha \tag{1}$$

where MW is average MW, K and $\alpha$ are constant depending on properties of polymer, solvent and conditions of analysis. In ordinary good solvents, the constants K and $\alpha$ obtained are valid only within a rather limited range of MW. IV value is dependent on polymer structures.

Intrinsic viscosity in a salt solution is commonly used to indicate molecular weight of a water soluble polymer. It is well known that a branched or crosslinked polymer gives lower intrinsic viscosity value than a linear polymer of the same type and the same molecular weight. A conventional Huggins relationship (Equation 2) is used to determine intrinsic viscosity, $[\eta]$, $$\eta_{SP}/C = [\eta] + k_H [\eta]^2 C \tag{2}$$

where $\eta_{SP}$ is the specific viscosity, C is the polymer concentration and $k_H$ is called the Huggins constant. Value of the Huggins constant, $k_H$, can be indicative of crosslink extent. A crosslinked polymer gives higher $k_H$ value but lower $[\eta]$ value than its corresponding linear polymer with the same molecular weight. Therefore, the measured $[\eta]$ value alone can not be used to compare molecular weight of polymers with different structures.

U.S. Pat. No. 6,323,306, herein incorporated by reference uses the following equation 3 to determine $[\eta]_L$ from measured $[\eta]$ and $k_H$ values to compare MW of polyDADMAC with different structures at an assumed $k_{HL}$ for a linear polyDADMAC $$[\eta]_L = \frac{\{1 + 4k_{HL}(1 + k_H)\}^{1/2} - 1}{2k_{HL}} [\eta] \quad (3)$$

$[\eta]_L$ is indicative of molecular weight and its value can be used to compare molecular weight of crosslinked polymers with different crosslink extent. However, measurement of both intrinsic viscosity and the Huggins constant involves time consuming measurements of four points of specific viscosity for a plotting using equation 3.

It is common in the industry to avoid the time consuming practice of measuring $[\eta]$ in favor of a single viscosity measurement at a defined polymer concentration.

A bulk viscosity (BV) at 20% polymer solution is widely used to measure and compare MW of high MW polyDADMAC products. However, for the reasons explained above a linear relationship between MW and the 20% BV is not justified and tends to give a much higher MW value for polymer with high 20% BV. For example, the greater than 10,000,000 MW alleged in U.S. Application No. 2004/0030039 for a polyDADMAC with a 20% BV of 11,500 cps is too high. However, viscosity at certain polymer concentration and temperature, such as the 20% BV at 25° C., does increase monotonically, though not linearly, with increasing MW and can be used directly to compare MW.

For the ultra high MW polyDADMAC of present invention, a 20% polymer solution is too concentrated, and the viscosity is generally much higher than 10,000 cps, and can not be conveniently measured.

In the present invention, bulk viscosity (BV) of a polymer solution in water at a concentration of, preferably, 1.0 wt %, and at a temperature of 25° C. is used to indicate MW of polyDADMAC.

The 1% BV increases with increasing MW and is less sensitive to differences in polyDADMAC structures. The 1% BV can be conveniently measured with a BROOKFIELD viscometer such as a Model DV-II+ system using LV spindles. Different combinations of spindle and spindle speed can be used depending on the viscosity range of the polymer to be measured. Table 1 list the viscometer spindle/speed combinations used in the present patent.

TABLE 1

| Viscosity range | Brookfield Viscometer | Spindle/speed |
| --- | --- | --- |
| 1 to 8 cps | Model LV with a UL adaptor | UL adaptor/60 rpm |
| 8 to 18 cps | Model LV with a UL adaptor | UL adaptor/30 rpm |
| 15 to 60 | Model DV-II+ | LV1/60 rpm |
| 60 to 400 cps | Model DV-II+ | LV2/60 rpm |
| 400 to 900 cps | Model DV-II+ | LV2/30 rpm |
| 900 to 3500 cps | Model DV-II+ | LV3/30 rpm |
| 3500 to 9000 cps | Model DV-II+ | LV3/12 rpm |

Intrinsic viscosity IV or $[\eta]$ present in the present invention disclosure is measured in 1M NaCl aqueous solution at 30° C. using an UBBELOHDE capillary viscometer.

The relationship between the 1% BV and the intrinsic viscosity measured in 1M NaCl aqueous solution is demonstrated in Table 2 for some linear ultra high MW polyDADMAC samples of the present invention:

TABLE 2

| 1% BV at 25° C., cps | Intrinsic viscosity, dL/g | Huggins constant |
| --- | --- | --- |
| 69 | 3.02 | 0.34 |
| 137 | 4.18 | 0.35 |
| 189 | 5.03 | 0.40 |

A branched or crosslinked DADMAC polymer with the same intrinsic viscosity and a higher Huggins constant tends to give a higher 1% BV value, reasonably indicating a higher MW. The 1% BV is preferably used to compare molecular weight.

A polymer solution of 1% for the 1% BV measurement is prepared by adding polymer powder, beads, or liquid emulsion polymer to water under high speed agitation of 500 to 1200 rpm for one hour. The 1% BV is measured right after the preparation of the 1% polymer solution. Polymer solutions made without agitation but allowed longer time to dissolve the polymer tend to give much higher 1% BV values.

The process encompassed by the present invention may be applied to bead, gel and emulsion polymerization. The gel may be further crushed and dried.

The preferred product form is free-flowing beads.

A bead for the purposes of the invention is a hard particle made by suspension polymerization. The particle size may vary from 1 to 5000 micron, preferably 10 to 2000 micron, and more preferably 100 to 1000 micron.

A bead or emulsion polymerization process according to the present invention proceeds according to steps i) to iii) and is feasible for commercial production to produce the desired very high molecular weight homopolymer of formula (I), preferably in less than 8 hours, and more preferably in less than 6 hours, without problems of agglomeration of gel beads and is also robust to variations in solvent quality and monomer quality that are problematic to the current bead polymerization processes.

The reaction system for the bead polymerization in step iii) can be optionally evacuated and heated to reflux at the desired post treatment temperature to remove the water from within the reaction system. The homopolymer is then isolated by standard means such as filtration and drying.

The present invention provides a method to produce ultra high molecular weight water-soluble polyDADMAC in forms, such as powder, beads, and latex particles in emulsion.

The invention also encompasses a bead comprising a homopolymer formed from diallyldialkyl ammonium salt monomer, wherein the homopolymer incorporates at least about 92 or 95 wt. % of the diallydialkyl ammonium salt monomer, preferably at least about 97 wt. % and especially at least about 98 wt. % of the monomer. The homopolymer is not necessarily high molecular weight. It has been surprisingly discovered that the application of the process of the invention is perfectly applicable to conventional molecular weight diallyidialkyl ammonium homopolymers wherein the process advantageously gives a bead containing high levels of diallyldialkyl ammonium monomer incorporated into polymer with low levels of unreacted monomer.

Low levels of unreacted monomer concentration may be determined by GPC. Low levels for the purposes of the invention means residual monomer as a weight % of active polymer of equal to or less than about 5 wt. %, preferably equal to or less than about 3, 2 or 1 wt. % of residual monomer.

When the bead is formed according to the method of the invention, the bead comprises the formed homopolymer, some residual unreacted monomer and water. The water may for example make up about 10 wt % of the total composition of the bead. For the purposes of the invention, when the inventors say the homopolymer incorporates at least about 95 wt. % of the diallydialkyl ammonium salt monomer, the wt. % used in this context refers to the total weight of the homopolymer only and does not include the water component of the bead.

One aspect of the present invention is that high initial initiator(s) concentration of about up to 5 wt. % based on total monomer is purposely used to produce ultra high molecular weight DADMAC polymers. The initiator(s) concentration is preferably from about 1 wt. % to about 5 wt. %, and more preferably from about 1.1 to about 4.0 wt. %. For example, the initiator(s) concentrations may be from about 1.2 to about 4.0 wt. %

Another aspect of the present invention is that a high temperature post treatment (relative to initiator half-life decomposition temperature) is purposely used at the end of reaction to, surprisingly, boosting MW with a significant residual monomer reduction at the same time. In this way, high MW polyDADMAC products with low residual monomer or a homopolymer of DADMAC of high efficiency conversion can be produced.

The residual monomer concentration in the formed homopolymer product or beads (either a high molecular weight or a conventional average molecular weight of about 10,000 to 500,000 MW) can be measured and used to determine the monomer conversion efficiency of the preparation method. The monomer conversion is a measure of the weight % of the total charged monomer incorporated into the homopolymer after polymerization. The conversion efficiency can be determined by measuring residual monomer in the product by high pressure liquid chromatography (HPLC) or gel permeation chromatograph (GPC).

A common knowledge of radical polymerization teaches that low initiator concentration and low reaction temperature should be used to achieve high MW. However, the reaction conditions of low initiator concentration and low reaction temperature would also result in undesirable low monomer conversion or high residual monomer in the product.

The present inventors have surprisingly discovered that an appropriate combination of high initiator(s) concentration with high reaction temperature at the end (post treatment) can surprisingly produce high MW water-soluble polyDADMAC with low residual monomer or diallydialkyl ammonium salt homopolymers of high conversion efficiency.

The present inventors have also surprisingly discovered that an appropriate combination of high initiator(s) concentration with high reaction temperature at the end (post treatment) can surprisingly produce conventional MW water-soluble polyDADMAC (preferably beads or emulsions) with low residual monomer or diallydialkyl ammonium salt homopolymers wherein the homopolymer incorporates at least about 95 wt. % of the charged total diallydialkyl ammonium salt monomer, preferably at least about 97 wt. % and especially at least about 98 wt. % of the charged monomer.

Still another aspect of the present invention is to use a staged reaction temperature control to achieve, in the polymerization stage, a monomer conversion of from 80 to 99 wt. %, preferably from 85 to 98 wt. %, and most preferably from 90 to 96 wt. %. Furthermore, the invention allows completion of the polymerization in a time period that is feasibly short for commercial production but also long enough to produce the desired high MW by running the polymerization at a reaction temperature for example, below the ten hour half-life (10 hr (t½)) decomposition temperature of the initiator used and then boosting the MW and reducing the residual monomer at the same time, in a post treatment stage, at a higher temperature.

Stages for the purposes of the invention is defined as heating and holding for time periods at different temperatures and optionally different time periods. The stages may apply to either step ii) (temperatures below 60° C. or for example, below the ten hour half-life decomposition temperature) or step iii) the post treatment wherein the temperature is for example near the one-hour half life decomposition temperature of the initiator.

In the polymerization step ii), multiple stages of temperature increases and holdings are preferably used to achieve a monomer conversion of from about 80 to about 99 wt. %, preferably from about 85 to about 98 wt. %, and most preferably from about 90 to about 96 wt. %, in a time period that is feasibly short for commercial production but also long enough to produce high MW and high conversion of monomer in the final homopolymer.

It is also possible that during step ii) the temperature of the monomer phase formed in step i) is ramped or incrementally raised from about 25° C. to about 60° C. over a period of time, for example about 1 to about 6 hours. The ramp rate may vary or be consistent over the time frame.

The reaction temperature in the polymerization step ii) is preferably increased in at least two or more stages, most preferably at least three stages. The temperature increase between the stages is preferably about 1 to about 50° C., more preferably about 5 to about 25° C., and most preferably about 8 to about 15° C.

For example, in the case of using V-50 initiator, the reaction temperature (step ii) is initially held at about 35° C. for 60 minutes, increased to hold at about 45° C. for about 120 minutes, and again increased to hold at about 56° C. for about 100 minutes before going to the final post treatment step iii).

The rate of temperature increase between stages or steps is preferably from about 0.1 to about 30° C./min and more preferably from about 0.5 to about 5° C./min.

The reaction temperature for the post treatment step can be from about 60° C. to about 120° C. depending on the initiator used, preferably, when V-50 initiator (2,2'-azobis(2-amidinopropane)dihydrochloride) is used, from about 65 to about 90° C., and more preferably from about 70 to about 85° C.

The temperature control stages are so designed that enough initiator is left for the next step iii) of higher temperature post treatment to boost molecular weight, presumably by chain extension, branching or crosslinking of the formed polymer, and at the same time substantially reducing residual monomer. The stages and amounts of initiator(s) are chosen to limit the extent of any crosslinking that occurs to an amount that does not adversely affect polymer solubility.

Still another aspect of the present invention is to provide a water-soluble DADMAC polymer with ultra high MW wherein the MW is indicated by a bulk viscosity at 1% polymer solution in deionized water (1% BV) and at 25° C. of above 20 cps, preferably above 50 cps, more preferably, above 80 cps, and most preferably above 100 cps.

Encompassed by the present invention is also a bead polymerization process proceeding according to steps i) to iii) which is feasible for commercial production to produce the desired high molecular weight homopolymer of formula (I) in less than 8 hours, preferably in less than 6 hours, without problems of agglomeration of gel beads and is also robust to variations in solvent quality and monomer quality that are problematic to current bead polymerization processes.

The reaction system of the bead polymerization in step iii) can be optionally evacuated and heated to reflux at the desired post treatment temperature to remove the water from within the reaction system. The homopolymer is then isolated by standard means such as filtration and drying.

The inverse suspension polymerization (bead polymerization) process relates to polymerization of water-soluble monomers of formula (I) dispersed in the form of water droplets in a water-insoluble organic phase. The droplets polymerize to a hard gel made up of water and polymer.

Typically the water is removed by azeotropic distillation permitting separation of the solid phase from the organic phase. However, one of the advantages of the bead polymerization process of the present invention is that the azeotropic distillation of water can be optionally omitted because the wet beads of very high molecular weight polyDADMAC formed can give non-sticky, hard wet beads capable of resisting agglomeration without agitation. The water in the wet beads can be removed by conventional heat drying after their separation from the organic solvent phase by filtration.

In the practice of the present invention an aqueous solution of the above-mentioned monomers of formula (I) is prepared in step i). Water may optionally be mixed with ethanol or methanol or a minor. amount of another water-miscible organic solvent. However, such a water based mixture has to be selected in such a manner that the monomer of formula I is soluble therein and that a two phase system is obtained when contacting the water based mixture with a water-immiscible inert organic liquid. Water is normally used as the only solvent for the monomers of formula I. Although the aqueous phase may contain the monomer(s) in a wide range of concentrations, a high initial monomer concentration is preferred in order to achieve a high polymerization rate and a high molar mass of the produced polymer. Aqueous solutions which are nearly saturated with the monomers are preferred. The preferred monomer concentrations in the aqueous solutions of course depend on the solubility of the monomer. In the case of diallyl dimethyl ammonium chloride (DADMAC) an aqueous solution may contain generally from 50 to 95 weight percent and preferably from about 60 to about 75.

The aqueous phase is prepared to contain a radical initiator or a mixture of radical inititators of from about 0.1 to about 5% concentration based on the active monomer weight, preferably from about 1.0% to about 4.5%, more preferably from about 1.2% to about 4.0%, and most preferably from about 1.5% to about 3.0%. Preferably, the initiator concentration in the aqueous phase is so designed that greater than about 1.0%, more preferably greater than about 1.2%, of the initiator based on total original active monomer charge is left after the reaction in step ii) and available for the high temperature post-treatment in step iii).

The aqueous monomer phase is preferably purged with an inert gas such as nitrogen and argon before the addition of the initiator and being dispersed to a water-immiscible organic solvent phase at reaction temperature.

The aqueous phase may also contain a chelant such as for example a water soluble salt of ethylenediaminetetracetic acid and salt of diethylenetriamine pentaacetic acid.

Polymerization of the monomer phase in droplets is achieved by dispersing the aqueous monomer phase in a water insoluble organic liquid containing a stabilizer to form an inverse suspension or emulsion under agitation (bead or emulsion polymerization). The polymerization of the inverse suspension system (step ii) is carried out by heating in stages at different temperatures below 60° C. to a monomer conversion of from about 80 to about 99 wt. %, preferably from about 85 to about 98 wt. %, and most preferably from 90 to 96%.

The temperature control stages are so designed that enough initiator is left for the next step of higher temperature post treatment to boost molecular weight, presumably by chain extension, branching or crosslinking of the formed polymer, and at the same time substantially reduce residual monomer. When water soluble V-50 compound (2,2'-azobis(2-amidino-propane)dihydrochloride) is used as the initiator, a three stage reaction temperature control may be used for example, stage 1: maintaining a starting reaction system temperature of about 35° C. and holding for about 1 hour;

stage 2: raising the reaction system temperature to about 45° C. and holding for about 2 hours and stage 3: raising the reaction system temperature to about 56° C. and holding for about 2.5 hours.

After the monomer conversion of above 90% is achieved and the formed polymer gel beads are hard enough to withstand agglomeration, the reaction system is post treated (step iii) with heat at a higher temperature in the range from 60 to 120° C. depending on the type of initiator used. When V-50 initiator is used, preferably in step iii) temperature ranges and holding periods range from 65 to 90° C., and more preferably from 70 to 85° C. for about 30 to 240 minutes, preferably 60 to 180 minutes, and more preferably from 90 to 120 minutes. This post treatment in step iii) at a temperature significantly higher than the polymerization temperatures in step ii) is an important part of the present invention to produce bead products of ultra high molecular weight polymer of diallyldialkyl ammonium halide with low residual monomer. During this post treatment stage, the water contained in the polymer beads can be optionally azeotropically distilled out by applying vacuum. The distillation to remove water can also be carried out after the reaction post treatment.

The continuous phase for the inverse polymerization is a liquid which is insoluble with the aqueous monomer. Any water-insoluble organic liquid is useful for providing the organic phase. Aromatic or aliphatic hydrocarbons which are optionally mixed with halogenated hydrocarbons are preferred.

Specific examples are cyclohexane, benzene, toluene, or xylene, mineral oils, mineral spirits, naphthol spirits, kerosenes and brominated and/or chlorinated hydrocarbons, such as 1,1,1-trichloroethane, 1,2-dichloropropane, tetrachloroethene, trichloropropanes and tetrachloromethane.

The preferred continuous phase is a liquid aliphatic hydrocarbon or mixture of aliphatic hydrocarbons, or mixture of hydrocarbon and naphthol spirit.

Mixtures of different hydrocarbons and halogenated hydrocarbons are also useful. Furthermore, aromatic ethers such as methyl phenyl ether are also useful organic liquids.

The volume ratio between the water-insoluble organic liquid and the aqueous monomer solution generally is from 1:3 to 20:1, preferably from 1:2 to 10:1, more preferably from 1:1 to 5:1.

It should be noted that the terms "water soluble" and "water-immiscible" refer to the behavior of the components at ambient pressure and at the prevailing polymerization temperature.

A stabilizing agent is added to the inverse suspension polymerization system to prevent or minimize the agglomeration of particles during the course of polymerization. U.S. Pat. Nos. 4,506,062 and 4,528,321 herein incorporated by reference give a more detailed explanation of the typical stabilizers that might be used in the present invention.

The preferred stabilizers are either completely soluble or form dispersions in the continuous phase but are substantially insoluble in the monomer phase and do not form micelles in the continuous phase. An emulsifier can also be a stabilizer.

A stabilizer can be a low molecular weight emulsifier, a polymeric surfactant, or mixture of both.

Useful emulsifiers are for example carboxylic acid glycerides, mainly the fatty acid glycerides such as the glycerol palmitates, sterates, oleates or linoleates. The glycerol mono-, di- and/or triesters are useful. Esters produced by the reaction of carboxylic acids, such as fatty acids, with sorbitol, such as the sorbitol palmitates, stearates, oleates or linoleates are also useful. The mono-, di-, tri and/or tetraesters are useful. Of the mentioned esters, the glycerol or sorbitol sterates or oleates are the most preferred ones. Soaps, such as the alkali metals salts of carboxylic acids having from 12 to 18 carbon atoms, preferably the sodium or potassium oleate, linoleate, stearate or palmitate are also useful emulsifiers. It has been found that the best polymerization results with substantially no agglomeration of the produced articles are achieved when emusifiers are used which have a hydrophile/lipophile balance (HLB number) of 3 to 5, preferably of 3.7 to 4.7. Several emulsifiers may be mixed.

Useful stabilizing agents can also be high molecular weight surfactant compounds which are preferably soluble or dispersible in the continuous phase. Such compounds include methyl cellulose ethers, hydroxypropyl methyl cellulose ethers, ethyl cellulose ethers, ethyl hydroxyethyl cellulose, methyl hydroxymethyl cellulose, starches, partially saponified polyvinyl acetates, saponified ethylene/vinyl acetate copolymers, alkali metal salts of polyacrylic acids or polymethacrylic acid, copolymers of styrene or vinyl acetate, copolymers of (meth)acrylates with (meth)acrylic acids or salts thereof, polyethylene imines, polyvinyl alcohols, polyalkyl (meth)acrylates, where the alkyl group is a linear hydrocarbon of 12-18 carbon atoms, with methacrylic acid and/or acrylic acid and mixtures thereof.

Preferred polymeric surfactants are ethyl hydroxylethyl cellulose, methyl hydroxymethyl cellulose, copolymers of (meth)acrylates with (meth)acrylic acids or salts thereof. The stabilizer is preferably used at an amount of from about 0.01 to about 5%, more preferably of from about 0.05 to about 1.5% and most preferably of from about 0.1 to about 1.0% each, based on the weight of the aqueous monomer solution.

The stabilizer is typically added to the water-insoluble inert organic liquid before the organic liquid and the aqueous monomer solution are mixed.

The aqueous solution generally comprises one or more polymerization initiators. Such polymerization initiators are generally known and usually are of the azo or peroxide type. Useful azo initiators are for example 2,2-azobis-(N,N'-dimethylene-isobutyramidine) dihydrochloride, 2,2'-azobis -(2-amidinopropane) dihydrochloride (V-50), 4,4'-azobis-(4-cyanopentane-carboxylic acid), 2,2'-Azobis[2-(5-methyl-2-imidazolin-2-yl)propane]dihydrochloride; 2,2'-Azobis[N-(2-carboxyethyl)-2-methylpropionamidine]tetrahydrate; 2,2'-Azobis[2-(3,4,5,6-tetrahydropyrimidin-2-yl)propane] dihydrochloride; and 2,2'-Azobis{2-methyl-N[2-(1-hydroxybuthyl)]propionamide.

Useful peroxide initiators are for example tert.-butylhydroperoxide, hydrogen peroxide, ammonium persulfate, potassium persulfate, sodium persulfate, or redox catalyst in combination with reducing agents such as iron(II)-ammonium sulfate, ascorbic acid, sodium methyl sulfinate, disodium disulfite, sodium hydrogen sulfite, sodium phosphite, potassium phosphite or hydrogen phosphite, sodium hypophosphite or potassium hypophosphite. These initiators can be used either alone or in combination with one another. Thus the rate of peroxide decomposition can be adapted, for example, to the particular polymerization temperature selected. Preferred redox catalysts are those from one or several peroxides in combination with a reducing agent.

The polymerization initiators are generally used in amounts ranging from 0.1 to 5% by weight and preferably greater than 1.0% by weight, based on the net amount of monomers employed. Most preferably the initiator is used at a concentration of greater than about 1.2% by weight to about 5%.

The initially charged polymerization initiators may comprise mixtures of various types such as combinations of water soluble azo initiator(s) and peroxide initiator(s) or combinations of different initiators exhibiting different half life properties. For example two different initiators may be initially charged, the first initiator is active at the step ii) temperature and the second initiator is active at the step iii) temperature.

For bead polymerization or emulsion polymerization a two-phase system is required. To initiate polymerization, a two-phase system is prepared which contains droplets of an aqueous solution of one or more of the above-mentioned monomers of formula (I) in an water-insoluble inert organic liquid.

In the practice of carrying out the process of the present invention, the aqueous phase, containing one or more types of said monomers of formula (I) and usually one or more reaction initiators in the above-mentioned amounts, is suspended in the water-insoluble organic liquid, for example by mixing the two phases under agitation. It is immaterial whether the aqueous solution is added to the water-insoluble organic liquid or vice versa. Preferably, the two phases are slowly mixed under vigorous stirring.

The stabilizer may be added in the above-mentioned amounts to the water-insoluble organic liquid before mixing the two phases. Alternatively, the stabilizer may be added after having mixed the two phases. However, the stabilizer is typically added to the water-insoluble inert organic liquid before the organic liquid and the aqueous monomer solution are mixed.

It is advisable to deoxygenate the resulting emulsion with nitrogen and then to increase the temperature of the reaction mixture whereby the polymerization is initiated.

Use of Ultra High Molecular Weight Polymers as Fixatives

There is a need for higher retention of fines and colloidal substances at lower contribution from fibers as mechanical filtration aid to prevent the build up of deposits leading to breaks, off spec paper and cleaning down-time. One way to overcome this problem is the improved fixation of undesired colloidal and fine material in form of wood pitch or binder-rich material from coated broke with fixing agents. To achieve this objective, ultra high molecular weight polyDADMACs as disclosed in the present invention can be used for this purpose.

In particular undesired colloidal in the form of wood pitch or binder-rich material is commonly refered to a "pitch" or "stickies". Stickies are also termed "white pitch".

"Pitch" as opposed to "white pitch" refers to colloidal dispersions of wood-derived hydrophobic particles released from the fibers during pulping processes and is also called wood pitch. The hydrophobic components of pitch, particularly triglycerides, are considered the major factors determining whether the presence of such pitch will lead to deposit problems. Pitch problems are seasonal because pitch composition varies by season and type of wood.

"Stickies" or "white pitch" is formed from coated broke, coated recycled waste and de-inked pulp. Deposition of pitch and stickies often lead to defects in finished product and paper machine downtime causing lost profit for the mill. These problems become more significant when paper mills "close up" their process water systems for conservation and environmental reasons. Thus the "pitch" and "stickies" need to be continuously removed from the system in a controlled manner, or these interfering substances will accumulate and eventually lead to deposit and runnability problems.

The ultra high molecular weight polyDADMAC of the invention has been found to be especially effective in fixation of these colloidal dispersion of hydrophobic particles to the fiber before they have a chance to agglomerate and deposit on the papermaking machinery leading to runnability problems.

The ultra high molecular weight polyDADMAC may be added to the furnish at any time prior to sheet formation. Thus the ultra high molecular weight polyDADMAC may be added in the thin stock or in the thick stock.

The ultra high molecular weight polyDADMAC is added to the furnish at amounts which range from about 0.1 kg/ton to about 12 kg/ton, preferably about 0.2 kg/ton to about 10 kg/ton and most preferably about 0.2 kg/ton to about 8 kg/ton. All weights are based on the dry weights of polymer and furnish.

The furnish may contain thermal mechanical pulp, recycled pulp, coated recycled pulp, recycled pulp, deinked pulp, coated broke or mixtures thereof. For example, the furnish may contain "stickies" or white pitch resulting from coated paper which is at least partially coated with binders or latex type materials. The furnish may also contain natural pitch resulting directly from the wood fibers.

The following examples describe certain embodiments of this invention, but the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated.

EXAMPLES

General Reaction Conditions to Achieve Ultra High Molecular Weight and Highly Incorporated DADMAC Polymer The oil phase is charged into a reactor equipped with an agitator. The oil phase is then mixed to dissolve while heating to approximately 40° C. and sparging the reactor content with nitrogen. An aqueous phase is prepared separately containing the diallyl dialkyl ammonium salt and a water soluble chelant. The pH is then adjusted to between 4.8 to 5.2 with HCL solution and 25% NaOH solution if necessary. The aqueous monomer solution is sparged with nitrogen for about an hour. A separate 40 to about 50 wt. % initiator solution is prepared by dissolving an initiator in deionized water. Once the aqueous monomer solution has been sparged for about one hour, the initiator solution is then added to the aqueous monomer solution and mixed well. The aqueous monomer solution with initiator is then added to the reactor containing the oil phase allowing the temperature to drop to about 30 to 33° C. to form the reaction mixture. The reaction mixture is maintained at a temperature of about 35 +/−2.0° C. for about 1 hour (stage 1). The temperature of the reaction mixture is slowly raised to about 45 +/−2.0° C. and held at this temperature for about 2 hours (stage 2). After stage 2) the reaction mixture is heated slowly to reach about 56 +/−2.0° C. and held for about 2.5 hours. At this point the reaction mixture is heated to reflux temperature at 82 +/−2.0° C. for about 2 hour and the water is azeotroped off. The reaction mixture is cooled and filtered. The filtered cake may be further dried in an oven and sieved to obtain a certain size bead.

Tables 3 and 4 give the composition of the oil and water phases.

TABLE 3

| | Oil phase | |
|---|---|---|
| Raw material | Concentration, wt % | Weight (g) |
| Naphthol spirits | 100% | 240.2 |
| Stabilizer | 27.5% | 1.2 |

The stabilizer is a copolymer of alkyl acrylates or methacrylates with acrylic and methacrylic acid.

TABLE 4

| | Aqueous phase | |
|---|---|---|
| | Concentration, wt % | Weight (g) |
| Raw material | | |
| DADMAC | 66.5% | 206.22 |
| DTPA-41 | 41% | 0.068 |
| HCl | 37% | 0.1-0.2 |
| NaOH (if needed) | 25% | 0.0 |
| Initiator solution | | |
| V-50 initiator | 100% | 2.53 |
| Deionized water for dissolving | | 2.87 |

DADMAC is diallydimethyl ammonium chloride.

DTPA-41 is pentasodium diethylenetriaminepentaacetate ($Na_5DTPA$) from BASF V-50 initiator is 2,2'-azobis(2-amidinopropane)dihydrochloride from Wako.

Performance Evaluation as Fixative

The following examples show their superior performance in comparison to commercial fixatives.

Two ultra high molecular weight polyDADMAC products (Product No. 1 and 2) listed in table 5 are made in accordance to the invention. These are compared against commercial products.

TABLE 5

| Polymer | Characterization of molecular weight[1] | Form | Polymer Chemistry | Residual Monomer[2] (wt. %) |
|---|---|---|---|---|
| Product No. 1 | IV = 6.24 dL/g (1% BV [cps] = 260) | Beads | Ultra high molecular weight polyDADMAC homopolymer | 0.61 |
| Product No. 2 | IV = 4.02 dL/g (1% BV [cps] = 132) | Beads | Ultra high molecular weight polyDADMAC homopolymer | 0.75 |

[1]The Intrinsic Viscosity (IV) was calculated from the 1% BV according to the linear relationship given in Table 2. The bulk viscosity is determined from a polymer solution in water at a concentration of 1.0 wt %, and at a temperature of 25° C.
[2]Residual monomer concentration is determined by GPC using an Agilent 1100 system; a Ultrhydrogel Linear GPC column from WATERS; Column temperature: 30° C.; Mobile phase: 0.2M NaCl aqueous solution with pH of 3.5; Injection volume: 100 uL Flow rate = 0.5 mL/min Detector type: refractive index. A standard solution containing 500 ppm monomer DADMAC in the mobile phase is used to calibrate the instrument. The peak for monomer DADMAC elutes at about 28 minutes and is well separated from the polymer peak which elutes before 25 minutes with the conditions used. Peak area for the monomer is used to calculate wt. % of monomer in the sample.

CIBA commercial products listed in Table 6 are used in the evaluation of before said invention products for comparison.

TABLE 6

| Polymer | Form | Polymer Chemistry |
|---|---|---|
| RAIFIX 120 | 20% aq. Solution | High molecular weight cationic liquid starch with D.S. = 0.7 of cationic charge |
| RAIFIX 01035 | 40% aq. Solution | Low molecular weight cationic liquid starch with D.S. = 0.7 of cationic charge |
| ALCOFIX 110[1] | 20% aq. Solution | High molecular weight polyDADMAC homopolymer |
| ALCOFIX 159 | 50% aq. Solution | Linear epichlorohydrin-dimethylamine polyamine |
| ALCOFIX 160 | 50% aq. Solution | Crosslinked epichlorohydrin-dimethylamine polyamine |
| ALCOFIX 169 | 44% aq. Solution | Low molecular weight polyDADMAC homopolymer |

[1]ALCOFIX 110 has a 1% BV = 10 cps

ALCOFIX and RAIFIX products are available from Ciba Specialty Chemical Corporation, Tarrytown, N.Y.

Test Procedures 250 mL pulp of about 3% to 4% consistency is measured into a beaker and is homogenized with an IKA propeller mixer for 1 minute at 1000 rpm. Afterwards the required amount of polymer is added to the agitated thick stock and allowed to mix for 2 minutes at 1000 rpm. The treated stock is then filtered through a WHATMAN 541 filter paper (11 cm diameter, coarse-retention for particles >20-25 microns) under vacuum. Vacuum filtration continues until 200 mL of filtrate is collected. Turbidity of the filtrate is measured with a suitable standard turbidimeter and is expressed as formazine turbidity unit [FTU]. Colloidal charge of the filtrate is determined by colloidal charge titration with a MUETEK PCD unit. The minus sign indicates anionic colloidal charge.

Dosage used is expressed in weight of active polymer per ton of dry weight pulp solids. The lower the filtrate turbidity the greater is the pitch and stickies control of the treatment employed and therefore the better the performance of the polymer used.

Flow cytometry (FCM) is used to determine the fixation of colloidal wood pitch in thermomechanical pulp and binder-rich particles in coated broke. The principle of FCM is to measure light scattering and fluorescence of individual particles in a suspension, as they pass a focused laser beam in a single line. Amount and approximate particle size are determined by adding a known amount of reference particles as internal standard. Detailed principle of FCM and its application for paper stock suspensions can be found in the literature, for instance in the dissertation of Lari Vähäsalo "White Pitch Deposition—Mechanisms and Measuring Techniques", Laboratory of Wood and Paper Industry, Faculty of Chemical Engineering, Åbo Akademi University, 2005.

In order to distinguish wood pitch and latex binder-rich particles from other material, the before said filtrate is treated with 0.1% of the non polar (hydrophobic) fluorescent dye "Nile Red" as ethanol solution. "Nile Red" crystallizes and is therefore insoluble in water, as a crystal it also lacks fluorescence, however when attached to wood pitch or binder particles it emits red light under excitation. After the dye addition the sample is diluted to a FCM rate of app. 2000 particles * s$^{-1}$ with subsequent addition of the reference particle solution. Flow cytometry is performed with a CIBA Contaminant Analyzer (CCA) according to the before exemplified principle.

EXAMPLE 2

Comparative Performance on Deinked Recycled Pulp (DIP)

Table 7 shows the fixation of fine and colloidal material, often referred to as anionic trash, as reduction in turbidity and anionic colloidal charge. Herein Product No. 2 (product of the invention) is tested against commercially successful fixatives for this type of pulp. It is apparent that Product No. 2, a high molecular weight polyDADMAC made in accordance to the invention, has unexpectedly beneficial results as a fixative in paper. This result is demonstrated by means of two different dosages. Although typically polyamines, such as Alcofix 159 and Alcofix 160 are used to treat recycled deinked pulp, Product No. 2 outperforms these standard fixatives.

TABLE 7

| DIP | Dosage as act. [kg/t] | Turbidity [FTU] | Colloidal charge [µeq/L] |
|---|---|---|---|
| Control | — | 2364 | −98 |
| ALCOFIX 159 | 0.5 | 461 | −50 |
| ALCOFIX 160 | 0.5 | 253 | −44 |
| Product No. 2 | 0.5 | 233 | −43 |
| RAIFIX 120 | 0.5 | 765 | −68 |
| ALCOFIX 159 | 1.0 | 80 | −37 |
| ALCOFIX 160 | 1.0 | 63 | −30 |
| Product No. 2 | 1.0 | 33 | −29 |
| RAIFIX 120 | 1.0 | 186 | −56 |

EXAMPLE 3

Comparative Performance on Thermomechanical Pulp (TMP)

Table 8 shows the fixation of fine and colloidal material as reduction in turbidity and anionic colloidal charge. ALCOFIX 110, 169 and RAIFIX 120 are commercially successful fixatives for mechanical pulp and are used to evaluate the performance of the ultra high molecular weight polyDADMACs. ALCOFIX 110 and ALCOFIX 169, both polyDADMACs, significantly reduce cationic demand, expressed as anionic colloidal charge. However, amongst the before mentioned products only the higher molecular weight polyDADMAC and ALCOFIX 110 also reduce turbidity. RAIFIX 120 is able to reduce turbidity without any significant reduction in cationic demand. This is probably due to its starch based chemistry with amphoteric character working with less cationic charge than other coagulants. The lowest and therefore best turbidity values are achieved with the invention Products No. 1 and No. 2. Since turbidity and cationic demand reduction are not coupled for all considered products, flow cytometry is used to distinguish between the more hydrophobic wood pitch and other anionic material. It is for instance possible that some products fix wood pitch particles without affecting anionic material, such as fiber fines.

TABLE 8

| TMP | Dosage as act. [kg/t] | Turbidity [FTU] | Colloidal charge [µeq/L] |
|---|---|---|---|
| Control | — | 1068 | −258 |
| ALCOFIX 110 | 0.5 | 229 | −140 |
|  | 0.8 | 142 | −96 |
|  | 1.2 | 123 | −66 |

TABLE 8-continued

| TMP | Dosage as act. [kg/t] | Turbidity [FTU] | Colloidal charge [µeq/L] |
|---|---|---|---|
| ALCOFIX 169 | 0.5 | 846 | −134 |
|  | 0.8 | 552 | −97 |
|  | 1.2 | 459 | −76 |
| RAIFIX 120 | 0.5 | 318 | −178 |
|  | 0.8 | 285 | −156 |
|  | 1.2 | 162 | −124 |
| Product No. 2 | 0.5 | 196 | −141 |
|  | 1.2 | 96 | −57 |
| Product No. 1 | 0.5 | 156 | −133 |
|  | 1.2 | 114 | −60 |

Figure 1:
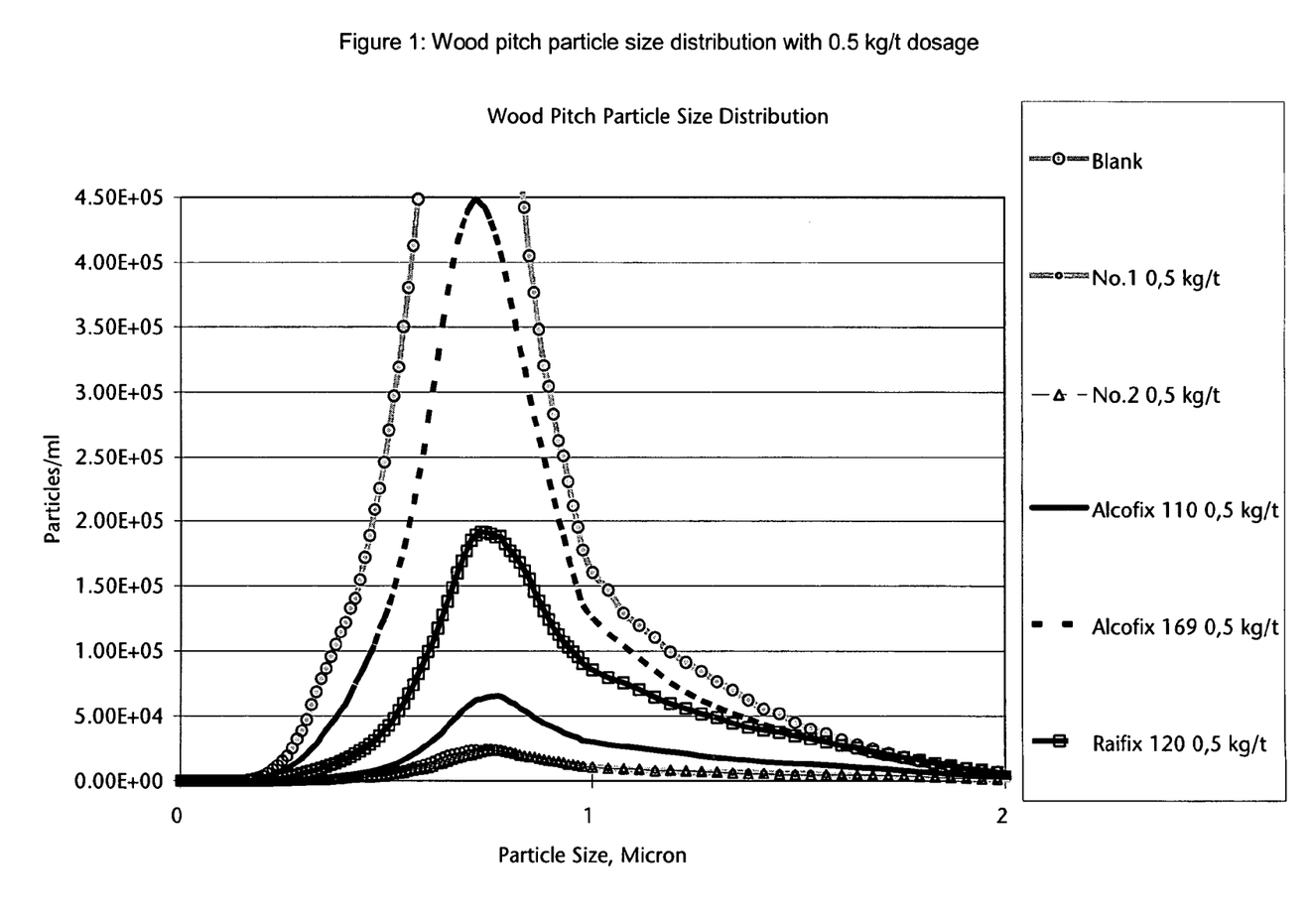
FIG. 1: Wood pitch particle size distribution with 0.5 kg/t dosage.
Figure 2:
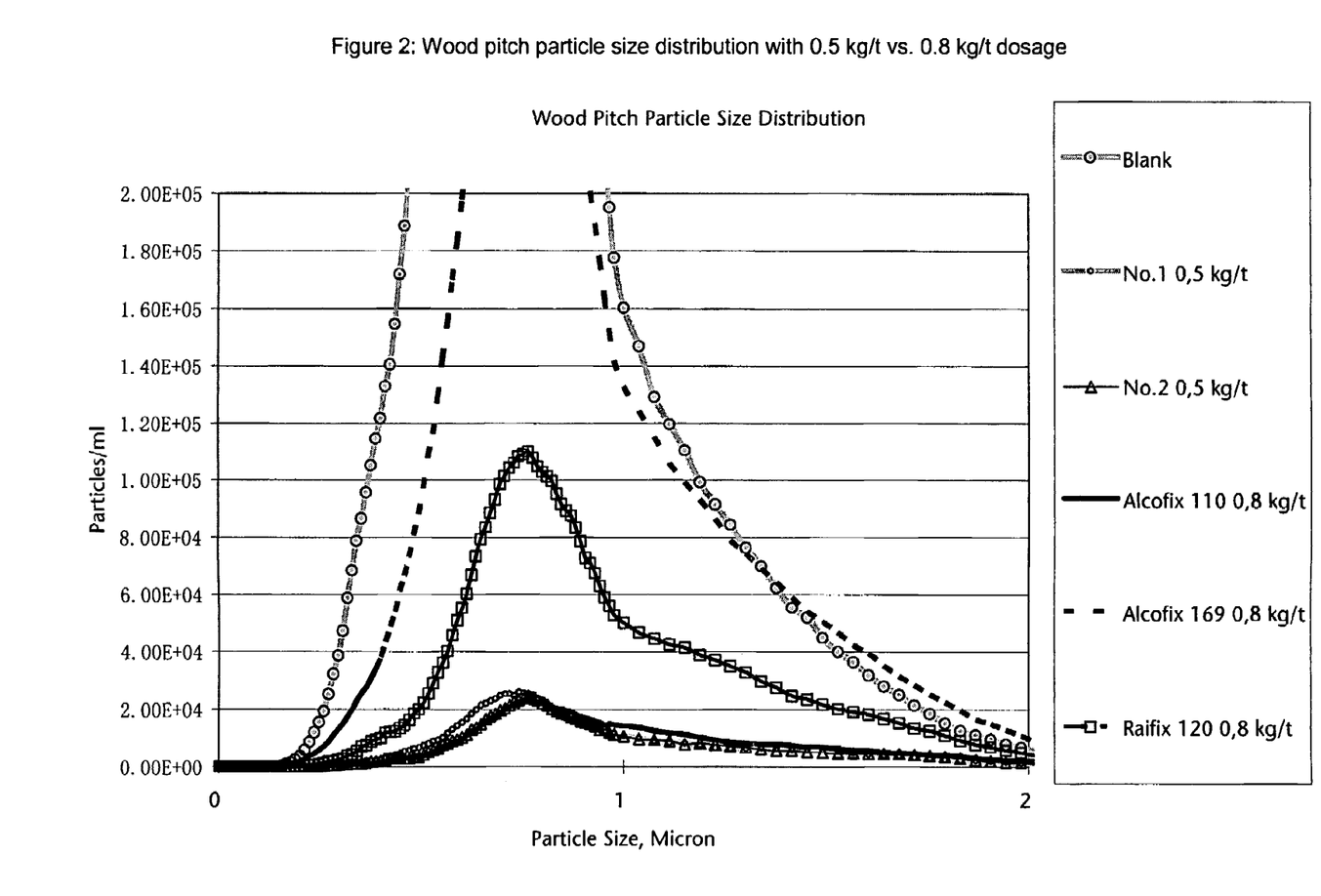
FIG. 2: Wood pitch particle size distribution with 0.5 kg/t vs. 0.8 kg/t dosage.

FIG. 1 displays the wood pitch particle size distribution as particles per milliliter over particle size in microns. The invention products no. 1 and 2 clearly outperform the existing commercial products and show the lowest pitch concentration over the whole particle size range. As demonstrated in FIG. 2, 0.5 kg/t of ultra high molecular weight polyDADMAC homopolymers equal the performance of 0.8 kg/t of Alcofix 110 polyDADMAC homopolymer. Hence the invention products work more effectively based on actives.

Figure 3:
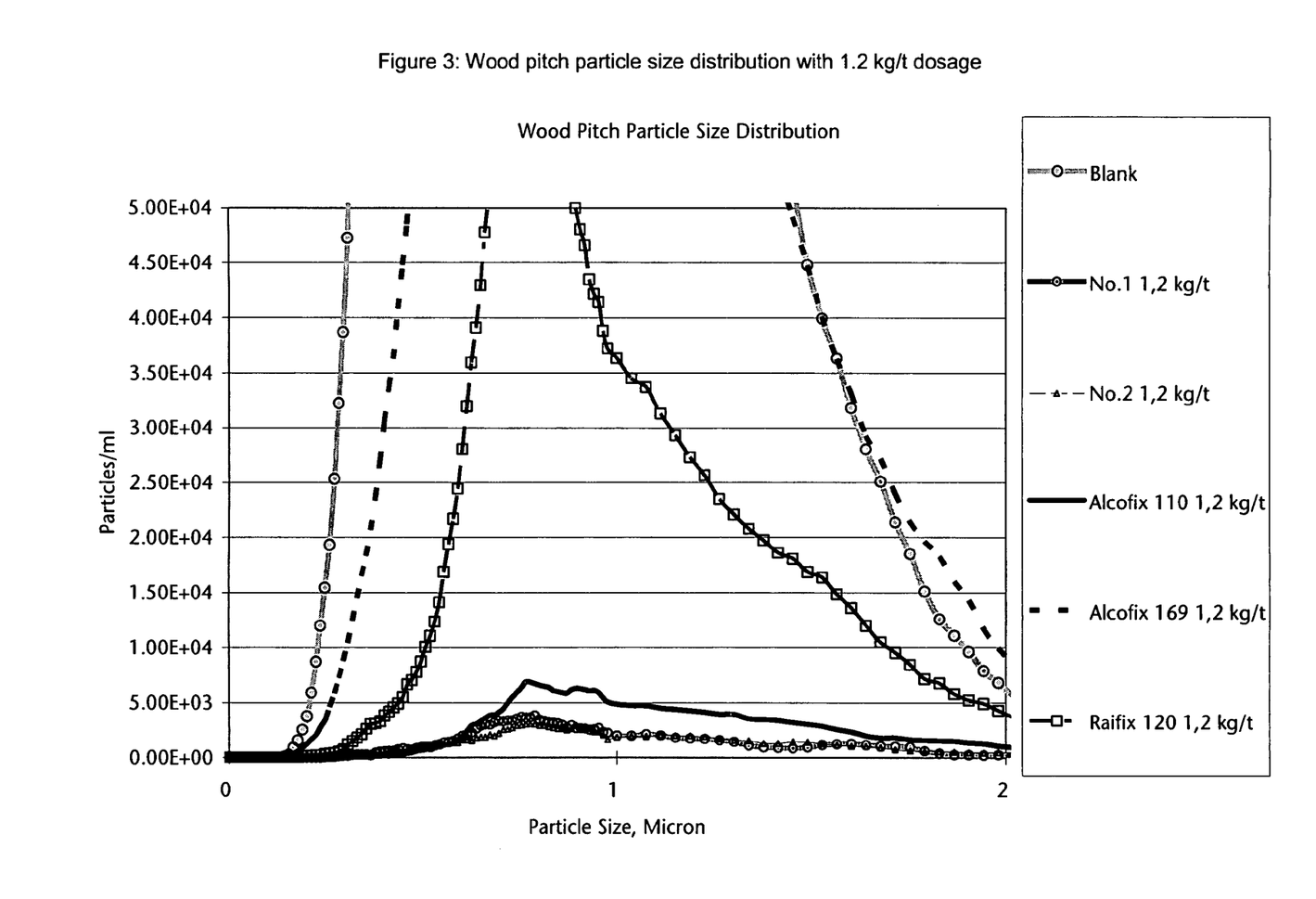
FIG. 3: Wood pitch particle size distribution with 1.2 kg/t dosage.

FIG. 3 shows the effects of an elevated coagulant dosage at 1.2 kg/t. The ultra high molecular weight polyDADMACs No. 1 and No. 2 clearly outperform ALCOFIX 110 and 169 as well as RAIFIX 120 in terms of hydrophobic wood pitch fixation (see FIGS. 1, 2 and 3 ). It is worthwhile remarking that the addition of 1.2 kg/t ALCOFIX 110 causes an agglomeration towards bigger pitch particles that are not completely fixed to the fiber, apparent from the arched, rightwards shifted particle size distribution curve (FIG. 3). This effect is contraproductive towards effective deposit control and does not appear when the products of the invention are used. Thus the invention products provide a broader dosage window in conjunction with an improved fixation performance.

EXAMPLE 4

Comparative Performance on Coated Broke

Figure 4:
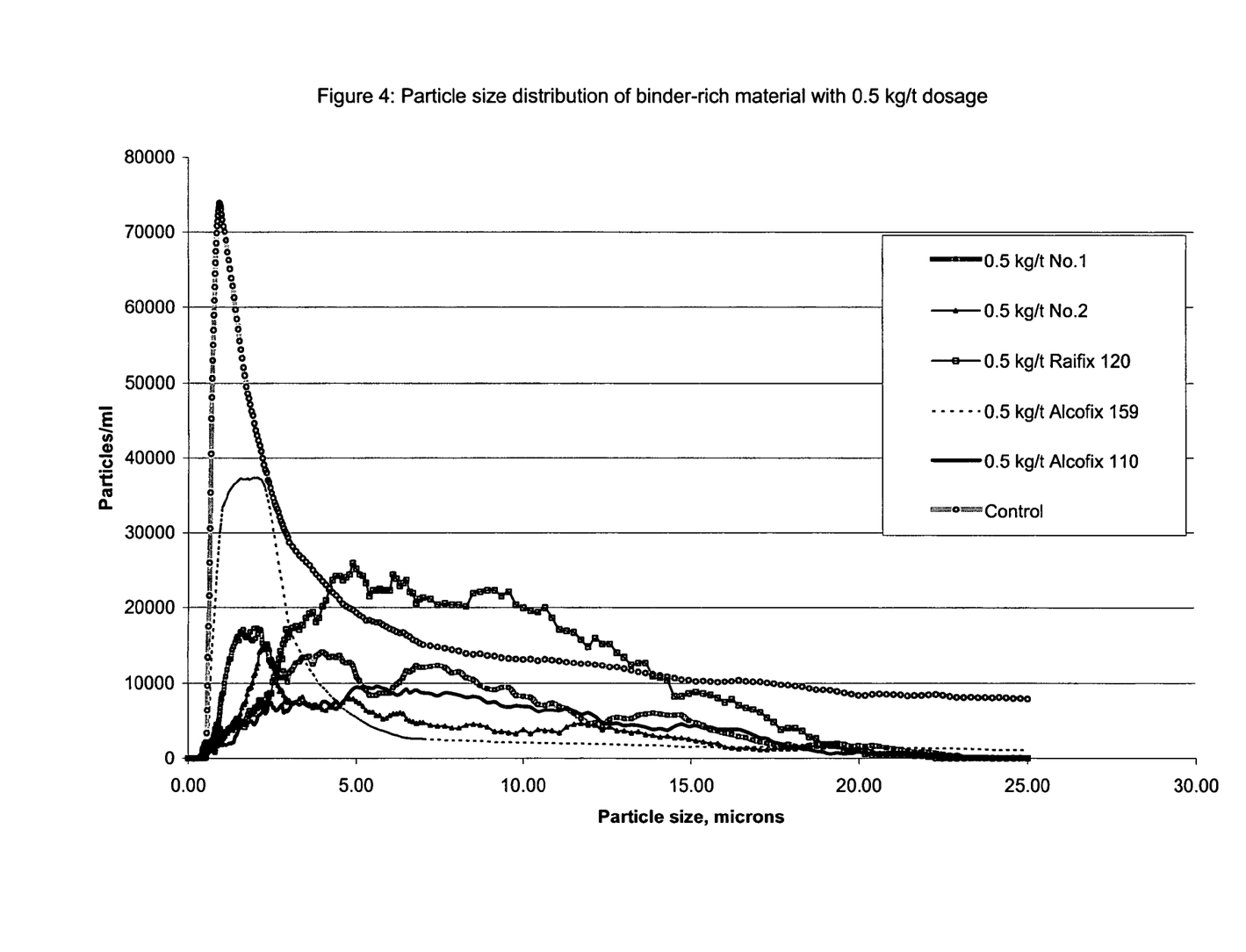
FIG. 4: Particle size distribution of binder-rich material with 0.5 kg/t dosage.
Figure 5:
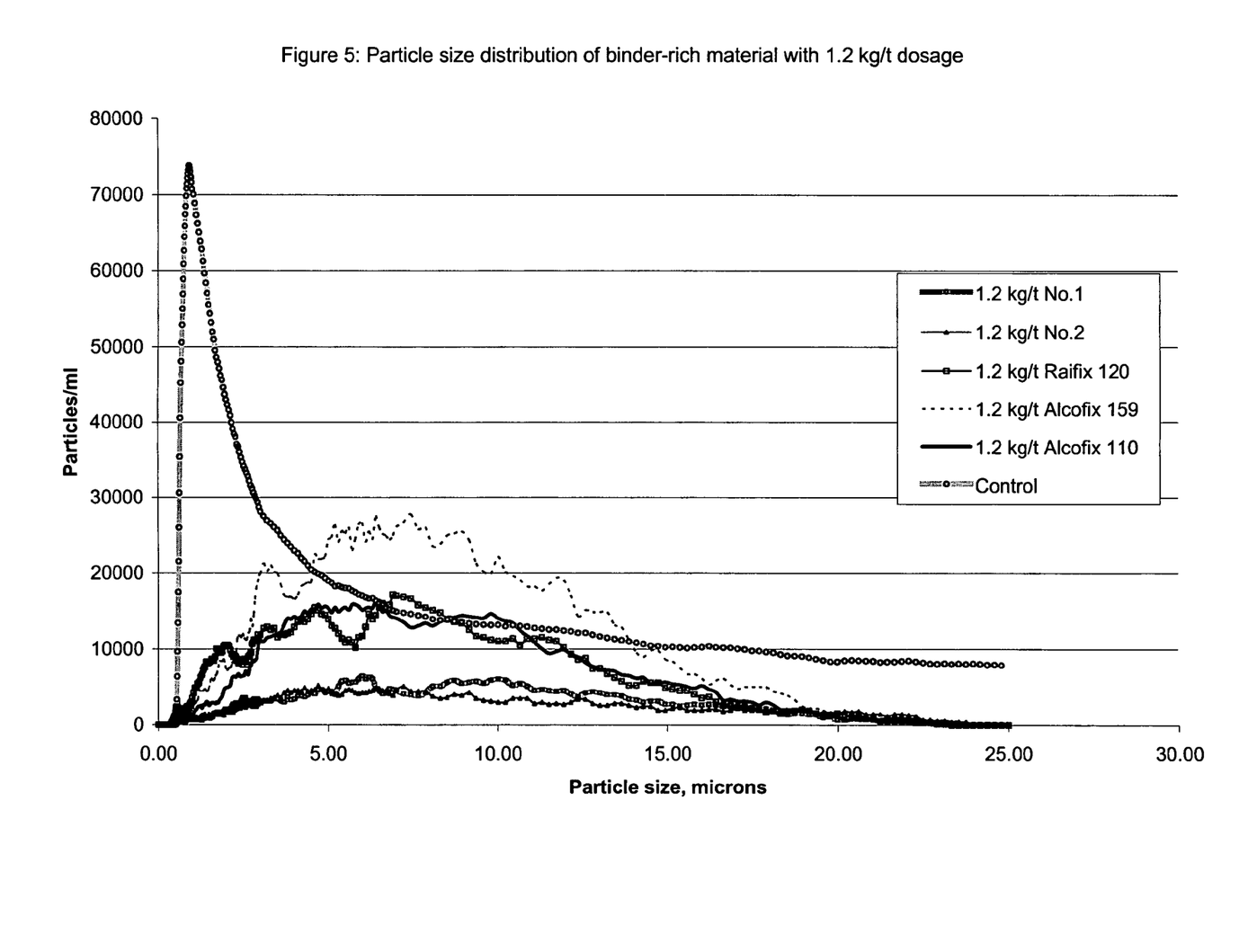
FIG. 5: Particle size distribution of binder-rich material with 1.2 kg/t dosage.

Table 9 shows the fixation of fine and colloidal material as reduction in turbidity and anionic colloidal charge. The highest turbidity reduction listed herein is achieved with the invention Products No. 1 and No. 2. Interestingly all other tested products do not significantly reduce turbidity associated with higher dosages. Cationic demand is reduced at 1.2 kg/t with the highly cationic polyDADMACs Products No. 1, No. 2, ALCOFIX 110 and with the polyamine ALCOFIX 159. Further investigations are carried out by flow cytometry to specifically determine the fixation of binder-rich material (FIGS. 4 and 5).

TABLE 9

| Coated broke | Dosage as act. [kg/t] | Turbidity [FTU] | Colloidal charge [µeq/L] |
|---|---|---|---|
| Control | — | 522 | −339 |
| ALCOFIX 110 | 0.5 | 208 | −103 |
|  | 0.8 | 202 | −133 |
|  | 1.2 | 226 | −69 |
| ALCOFIX 159 | 0.5 | 317 | −197 |
|  | 0.8 | 272 | −140 |
|  | 1.2 | 284 | −111 |
| RAIFIX 120 | 0.5 | 245 | −293 |
|  | 0.8 | 236 | −261 |
|  | 1.2 | 233 | −204 |

TABLE 9-continued

| Coated broke | Dosage as act. [kg/t] | Turbidity [FTU] | Colloidal charge [µeq/L] |
|---|---|---|---|
| Product No. 1 | 0.5 | 208 | −142 |
|  | 1.2 | 149 | −67 |
| Product No. 2 | 0.5 | 157 | −229 |
|  | 1.2 | 144 | −81 |

FIG. 4 shows the particle size distribution of binder-rich particles in the filtrate of coated broke. It appears that Product No. 2 achieves the highest reduction of binder-rich particles, followed by ALCOFIX 110 and the invention Product No. 1. The polyamine ALCOFIX 159 slightly reduces hydrophobic particles in the range of 1-5 microns but shows on the other hand good fixation of particles between 5 and 25 microns.

RAIFIX 120 strongly agglomerates small binder-rich particles to bigger aggregates, which is detrimental to good contaminant control. In fact aggregation of binder-rich particles is the main reason for white pitch deposition, and is therefore to be avoided under all circumstances. Thus all in all, Product No. 2 shows the most balanced fixation over all particle sizes and therefore the best performance amongst all tested products.

FIG. 5 shows the effects of an elevated coagulant dosage at 1.2 kg/t. In the case of the invention Products No. 1 and No. 2, a dosage of 1.2 kg/t leads to an almost complete fixation of binder-rich material to the fiber. On the other hand all other products tend to agglomerate the 1-5 microns fraction into bigger particles. Without sufficient fixation of such, this will lead to build up of white pitch with all affiliated negative effects within paper production. Only the invention products ensure this enormously important feature for operational reliability with respect to deposit problems in paper machine systems.

We claim:

1. A method of making a diallyldialkyl ammonium salt homopolymer wherein the method comprises
    i) preparing an aqueous monomer phase containing a monomer of diallyldialkyl ammonium salt, a radical initiator or mixture of radical initiators, and optionally a chelating agent,
    ii) heating the aqueous monomer phase formed in step i) at temperature(s) below about 60° C. to a monomer conversion to homopolymer from about 80 to about 99 wt. %, wherein substantially all the initiator is added in step i) or before heating in step ii) and the initiator concentration is about 0.1 to about 5.0 wt. % based on the monomer, and
    iii) then post treating the formed homopolymer by heating to a temperature in the range from about 60 to about 120° C.

2. A method according to claim 1, wherein at least 0.5 wt. % of the initiator(s) is available for the post treatment in step iii).

3. A method according to claim 1, wherein at least ½ of the initial initiator(s) charge is available for the post treatment in step iii).

4. A method according to claim 2, wherein at least about 1.0 wt. % of the initiator(s) is available for the post treatment in step iii).

5. A method according to claim 1, wherein the monomer conversion in step ii) is from about 85 to about 98 wt %.

6. A method according to claim 1, wherein the heating in step ii) is ramped or incrementally raised from about 25° C. to about 60° C. over a period of time.

7. A method according to claim 1, wherein the heating in step ii) is carried out in stages and the stages are defined as heating for time periods of different temperatures below about 60° C.

8. A method according to claim 7, wherein the different temperatures are increased successively between the stages and the different temperatures are separated by about 1 to about 50° C.

9. A method according to claim 8, wherein the different temperatures are separated by about 5 to about 25° C.

10. A method according to claim 7, wherein the time periods are from about 30 to about 240 minutes.

11. A method according to claim 1, wherein the monomer of the aqueous monomer phase is a monomer of formula (I)

wherein
$R_1$ and $R_2$ independently are hydrogen or $C_1$-$C_4$ alkyl, hydroxyl $C_1$-$C_4$alkyl, carboxy $C_1$-$C_4$ alkyl, carboxyamide $C_1$-$C_4$alkyl, alkoxyalkyl group, wherein the alkoxyalkyl group is defined as having from 1 to 18 carbon atoms in the alkyl group;
$R_3$ and $R_5$ independently are hydrogen, methyl, ethyl or halogen;
$R_4$ and $R_6$ independently are hydrogen, $C_1$-$C_6$alkyl, or halogen; and
$Y^-$ is an anion.

12. A method according to claim 11, wherein $Y^-$ is a halide.

13. A method according to claim 1, wherein the aqueous monomer phase is dispersed in a water-insoluble medium.

14. A method according to claim 11, wherein the water-insoluble medium contains a dispersion stabilizer.

15. A method according to claim 14, wherein the stabilizer is low molecular weight emulsifier, a polymeric surfactant, or mixture of both.

16. A method according to claim 15, wherein the stabilizer is a polymeric surfactant and the surfactant is selected from the group consisting of methyl cellulose ethers, hydroxypropyl methyl cellulose ethers, ethyl cellulose ethers, ethyl hydroxyethyl cellulose, methyl hydroxymethyl cellulose, starches, partially saponified polyvinyl acetates, saponified ethylene/vinyl acetate copolymers, alkali metal salts of polyacrylic acids or polymethacrylic acid, copolymers of styrene or vinyl acetate, copolymers of (meth)acrylates with (meth) acrylic acids or salts thereof, polyethylene imines, polyvinyl alcohols, alkyl methacrylates, where the alkyl group is a linear hydrocarbon of 12-18 carbon atoms, with methacrylic acid and/or acrylic acid and mixtures thereof.

17. A method according to claim 16, wherein the polymeric surfactant is ethyl hydoxyethyl cellulose, methyl hydroxymethyl cellulose, copolymers of (meth)acrylates with (meth) acrylic acids or salts thereof.

18. A method according to claim 13, wherein the water insoluble medium is selected from the group consisting of a hydrocarbon and hydrocarbon mixture.

19. A method according to claim 18, wherein the hydrocarbon is benzene, xylene, toluene, cyclohexane, fuel oil, kerosene, odorless mineral spirits, mineral oils, mineral spirits, naphthol spirits, brominated and/or chlorinated hydrocarbons, aromatic ethers or mixtures thereof.

20. A method according to claim 1, wherein the method further comprises separating the formed homopolymer in step iii) from the liquid medium and drying.

21. A process according to claim 20, wherein the formed homopolymer is separated from the liquid medium by azeotropic distillation.

22. A method according to claim 1, wherein the formed homopolymer in step iii) is a bead.

23. A method according to claim 1, wherein the formed homopolymer in step iii) is a gel.

24. A method according to claim 23, wherein the gel is dried and crushed to form a powder.

25. A method according to claim 13, wherein the formed homopolymer in step iii) is in an inverse emulsion.

26. A method according to claim 1, wherein the initiator or initiators are water soluble.

27. A method according to claim 1, wherein the initiator or initiators are an azo initiator, a peroxide, a redox catalyst in combination with reducing agents, or some combination thereof.

28. A method according to claim 27, wherein the azoinitiator is selected from the group consisting of 2,2-azobis-(N, N'-dimethylene-isobutyramidine) dihydrochloride, 2,2'-azobis-(2-amidinopropane) dihydrochloride, 4,4'-azobis-(4-cyanopentane-carboxylic acid); 2,2'-Azobis[2-(5-methyl-2-imidazolin-2-yl)propane]dihydrochloride; 2,2'-Azobis[N-(2-carboxyethyl)-2-methylpropionamidine]tetrahydrate; 2,2'-Azobis[2-(3,4,5,6-tetrahydropyrimidin-2-yl)propane] dihydrochloride; and 2,2'-Azobis{2-methyl-N-[2-(1-hydroxybuthyl)]propionamide;
the peroxide initiator is selected from the group consisting of tert.-butylhydroperoxide, hydrogen peroxide, ammonium persulfate, potassium persulfate and sodium persulfate;
the redox catalyst in combination with reducing agents is selected from the group consisting of iron(II)-ammonium sulfate, ascorbic acid, sodium methyl sulfinate, disodium disulfite, sodium hydrogen sulfite, sodium phosphite, potassium phosphate, hydrogen phosphite, sodium hypophosphite and potassium hypophosphite.

* * * * *